United States Patent [19]

Ward

[11] Patent Number: 5,329,770
[45] Date of Patent: Jul. 19, 1994

[54] EXHAUST GAS TURBINE DRIVE SYSTEM FOR ENGINE ACCESSORIES

[76] Inventor: Michael S. Ward, 300 N. Main, Excelsior Springs, Mo. 64024

[21] Appl. No.: 57,789

[22] Filed: May 6, 1993

[51] Int. Cl.[5] .............................................. F02G 5/02
[52] U.S. Cl. ..................................................... 60/597
[58] Field of Search ........................ 60/431, 597, 598; 417/380

[56] References Cited

U.S. PATENT DOCUMENTS

| | | | |
|---|---|---|---|
| 3,490,229 | 1/1970 | Klein | 60/431 X |
| 3,885,386 | 5/1975 | Bachmann . | |
| 3,979,913 | 9/1976 | Yates . | |
| 4,011,725 | 3/1977 | Bachmann . | |
| 4,391,098 | 7/1983 | Kosuge . | |
| 4,474,007 | 10/1984 | Kronogard et al. . | |
| 4,535,592 | 8/1985 | Zinsmeyer . | |
| 4,665,704 | 5/1987 | Hartwig . | |
| 4,738,104 | 4/1988 | Hahmann et al. | 60/431 |
| 5,138,840 | 8/1992 | Oguchi et al. | 60/597 X |

FOREIGN PATENT DOCUMENTS

| | | | |
|---|---|---|---|
| 357631 | 8/1922 | Fed. Rep. of Germany | 60/597 |
| 871855 | 3/1953 | Fed. Rep. of Germany | 60/597 |
| 3115203 | 11/1982 | Fed. Rep. of Germany | 60/597 |
| 15443 | 1/1989 | Japan | 60/597 |
| WO85/01779 | 4/1985 | PCT Int'l Appl. | 60/597 |

Primary Examiner—Michael Koczo
Attorney, Agent, or Firm—Litman, McMahon & Brown

[57] ABSTRACT

An exhaust gas drive system for engine accessories includes a turbine positioned in the exhaust system of the engine of a vehicle for rotation of the turbine by the pressure of the exhaust gas. The turbine is connected through a reduction transmission to a hydraulic pump which is fluidically connected to respective hydraulic motors which drive the accessories. Communication of exhaust gas to the turbine is controlled by a waste gate. The flow of hydraulic fluid to the hydraulic motors is controlled by actuator valves which operate in an on-/off manner or are adjustable for variable control of the accessories. A computer monitors engine speed and controls the position of the waste gate to thereby maintain a substantially constant speed of the turbine. Alternatively, a secondary output shaft of the reduction transmission has a drive pulley thereon for belt driving an accessory having a driven pulley on an input shaft thereof.

21 Claims, 4 Drawing Sheets

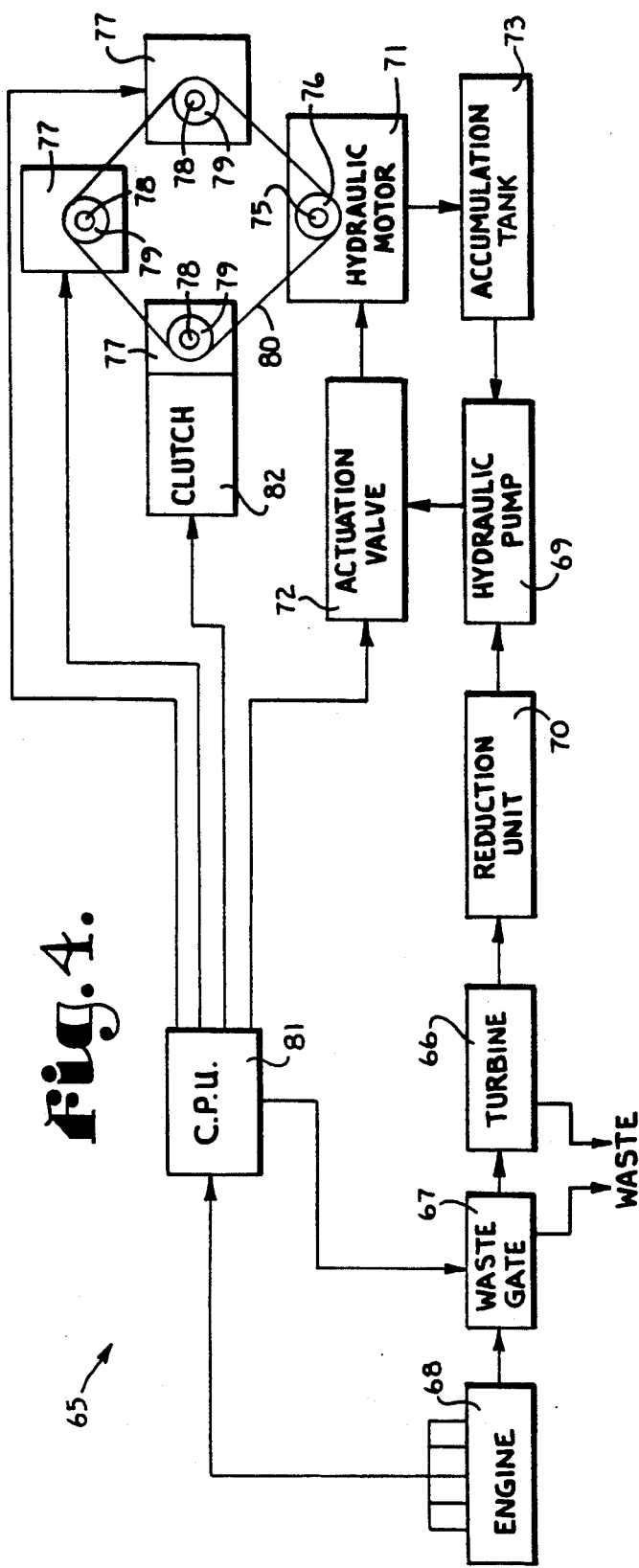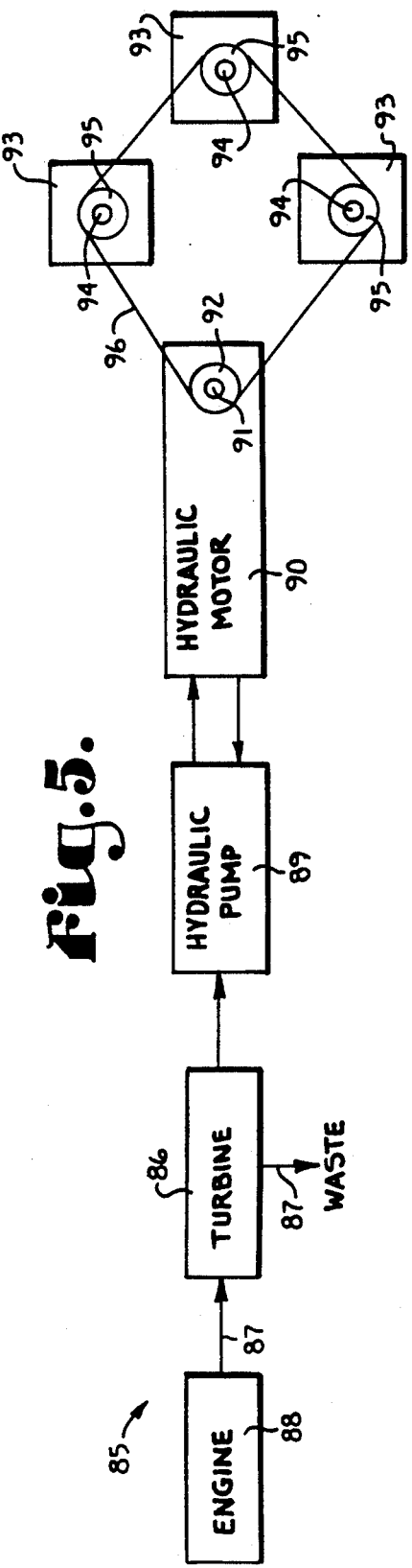

EXHAUST GAS TURBINE DRIVE SYSTEM FOR ENGINE ACCESSORIES

BACKGROUND OF THE INVENTION

1. Field of the Invention

The present invention relates generally to internal combustion engines, and in particular to a system for driving engine accessories with exhaust gas.

2. Description of the Related Art

The output power of an automotive engine is used not only to propel the vehicle having the engine mounted therein but also to drive engine subsystems or accessories, such as an alternator, a water pump, the compressor of an air conditioner, power steering, power brakes, pollution control pumps, and the like. Such subsystems and accessories are conventionally driven from the engine shaft, typically by pulleys and belts engaged therebetween. Specialty types of vehicles often have other types of devices which are driven from the power of their engines. Large trucks usually have engine driven compressors to provide compressed air for air brakes. Tow trucks usually have hydraulic pumps to drive winches and hydraulic lift cylinders. Agricultural tractors often have power take-off (PTO) shafts geared from the tractor transmission as well as hydraulic pumps. Construction and excavation vehicles employ hydraulic pumps to drive hydraulic cylinders for the operating devices thereof. The engine power required to drive the accessories of the engine is not available for propelling the vehicle having the engine mounted therein.

One of the problems associated with engine and vehicle accessories which are belt driven from the engine crankshaft is uneven wear of the front and rear main bearings of the engine. The tension in the belt engaged with the main pulley or harmonic balancer/pulley combination usually pulls the front end of the shaft upward, which is reacted to by the rear end of the crankshaft pushing downward on the main rear bearing. The problem is exacerbated if the belts are over-tensioned. Such radial forces on the crankshaft ends accelerate bearing wear which can result in oil leakage through the worn bearings as clearances are enlarged and the circulation of ground bearing materials throughout the engine which increases engine wear and increases the tendency of some oil passages to clog.

Another problem with belt driven accessories and accessories which are otherwise driven directly from the crankshaft is that the accessories must be clustered around and in close proximity to the engine. The result is that the engine compartments of modern vehicles are extremely crowded, making access for maintenance and repair difficult.

Some engine subsystems and accessories are vital to the operation of the engine or the vehicle and are required to be operating or available for use whenever the engine is running. Other accessories are used relatively infrequently and may be effectively disengaged when not in use, by means such as a solenoid operated clutch or the like. Typically, belt driven accessories are driven at a speed which is related to the rotational speed of the engine crankshaft. Further control is usually accomplished in an on/off manner. For example, the alternator is cycled on and off by an internal voltage regulator. The air conditioner compressor has a solenoid clutch which is thermostatically controlled in an on/off manner. Coolant circulation is controlled by a thermostatic valve which bypasses the radiator unless the coolant temperature exceeds the set point of the thermostat. Radiator fans on modern automobiles are often rotated by a thermostatically controlled electric motor, instead of being belt driven from the engine crankshaft as was formerly done.

Conventional automotive engines are not notably energy efficient. Combustion of the fuel, usually gasoline, is incomplete with a small proportion of the consumed fuel being exhausted to the atmosphere uncombusted and a somewhat larger proportion being exhausted to the atmosphere in an incompletely combusted state as carbon monoxide. Of the energy which is derived from the combustion of the fuel, a large proportion is wasted without doing useful work as heated exhaust gases.

In response to the decreasing supplies of crude oil and the resulting rise in prices of automotive fuel and the increasing concerns regarding atmospheric pollution caused by automotive emissions, efforts have been directed to increasing the fuel efficiency and reducing the emissions of automobile engines. Accordingly, passenger cars and engines therefor have been reduced in size, or "downsized". One result of such downsizing is that some aspects of performance, such as start-off and passing acceleration, suffer. Acceleration performance in an automobile is not merely a recreational aspect of driving, but is also a safety concern, particularly in safely entering high speed, congested traffic without disrupting the traffic flow.

In order to increase their acceleration performance, some cars are equipped with turbo-superchargers or turbochargers which supercharge the engine during hard acceleration. A turbocharger includes a turbine driven by exhaust gases and connected to a compressor feeding air to the intake of the engine at superatmospheric pressure to increase the power output from the engine. The communication of exhaust gases to the turbine is controlled by a waste gate in the exhaust system which is often controlled by engine vacuum or which may be linked to the accelerator pedal such that the waste gate is opened to communicate the exhaust gases to the turbine when the accelerator is pressed past a given point. Otherwise, the turbine is bypassed by the waste gate whereby the engine normally operates in a nonsupercharged mode for economy. Many large diesel trucks employ exhaust driven turbochargers in combination with belt driven superchargers to increase the performance of an engine of a given size rather than employing a larger engine.

SUMMARY OF THE INVENTION

The present invention provides an arrangement for driving engine and vehicle accessories from engine exhaust. A turbine is positioned in the exhaust system of the vehicle and has exhaust gas communicated thereto by a waste gate. The turbine is drivingly connected to a speed reduction transmission to gear down the speed of an output shaft thereof. In a hydraulic drive embodiment of the invention, a hydraulic pump is drivingly connected to the output shaft of the speed reduction transmission and is hydraulically connected by actuator valves to a plurality of hydraulic motors to which are connected drive shafts of the various accessories. The actuator valves are operable to enable, disable, or modulate the flow of hydraulic fluid from the pump to the respective hydraulic motors whereby the accessories can be selectively operated and variably controlled.

The arrangement is preferably controlled by a computer which receives manual or automatic control inputs and relays commands to the actuator valves. A manual control input could be, for example, the manual turning on and a temperature setting of a vehicle air conditioner whose compressor is one of the hydraulically driven accessories, whereas an automatic control input could be from a thermostat of the air conditioner. Preferably, the computer monitors the engine speed and controls the position of the waste gate to vary the communication of exhaust gas to the turbine in such a manner as to maintain a desired output of hydraulic fluid for a given accessory load as the engine speed varies or as accessories are activated and deactivated.

In a first modified or belt drive embodiment of the arrangement according to the present invention, each of the accessories has an input shaft with a driven pulley mounted thereon. The speed reduction transmission has an output shaft with a drive pulley mounted thereon. An endless drive belt is reeved about the drive pulley and the driven pulleys whereby rotation of the drive pulley is transferred to each of the driven pulleys. Rotational speed of the accessory input shafts can be set by appropriate sizing of the particular driven pulleys. Accessories which are preferred to be controlled by on/off switching incorporate solenoid driven clutches therein. The clutches may be controlled directly by manual switches and relays or may be controlled from the computer by way of suitable current drivers and relays, as necessary.

A second modified or combination drive embodiment of the present invention combines aspects of the hydraulic drive embodiment and the belt drive embodiment. A speed reduction unit for the combination drive embodiment is provided with two output shafts. One shaft is engaged with a hydraulic pump, and the second shaft has a drive pulley mounted thereon. Accessories driven by the hydraulic pump and those which are belt driven operate similar respectively to the accessories described in the hydraulic drive and the belt drive embodiments of the present invention, as described above.

In a third modified or indirect hydraulic drive embodiment of the present invention, a single hydraulic motor is driven by a hydraulic pump through an actuation valve. An output shaft of the hydraulic motor has a drive pulley mounted thereon. Each of the accessories has an input shaft with a driven pulley mounted thereon. An endless drive belt transfers drive from the drive pulley to the driven pulleys of the accessories.

In a fourth modified or simplified embodiment of the present invention, a hydraulic pump is driven directly by the exhaust gas turbine. The turbine blades are modified in pitch and clearance whereby for a given gas flow volume therepast, the turbine is rotated at a slower speed than normally occurs with exhaust driven turbines. Additionally, the clearances between a rotor and stator of the hydraulic pump are enlarged whereby the hydraulic fluid volume output is reduced for a given rotational speed of the pump rotor. The modifications to the turbine and hydraulic pump eliminate the need for a speed reduction transmission, which decreases the manufacturing cost for the simplified embodiment of the invention. A hydraulic motor driven by the pump has a drive pulley on an output shaft thereof which is engaged with driven pulleys of the accessories through an endless drive belt.

OBJECTS AND ADVANTAGES OF THE INVENTION

The principal objects of the present invention are: to provide an arrangement for driving engine accessories and accessories of a vehicle by energy which is otherwise wasted; to provide such an arrangement which avoids belt-driving engine accessories from a pulley on the engine crankshaft and thereby avoids uneven crankshaft bearing wear resulting therefrom; to provide such an arrangement which increases the versatility of mounting engine accessories and has the capability of lessening engine compartment crowding; to provide, in particular, an arrangement for driving accessories from the exhaust gas of an internal combustion engine of the vehicle; to provide such an arrangement including a turbine positioned in the exhaust system of the engine and rotated by the pressure of exhaust gas emitted by the engine; to provide such an arrangement including means for reducing the rotational speed of the exhaust gas turbine and/or the rotational speed of shafts coupled to the turbine and/or for reducing the effect of the rotational speed of shafts coupled to the turbine; to provide such an arrangement including a reduction transmission with an input shaft connected to the turbine and having at least one output shaft rotating at a fraction of the angular speed of the turbine; to provide such an arrangement including a hydraulic pump engaged with the reduction transmission output shaft and fluidically connected to respective hydraulic motors which are drivingly engaged with the accessories to drive same; to provide an alternative embodiment of the arrangement wherein the reduction transmission has a second output shaft with a drive pulley thereon, a driven pulley on a drive shaft of an accessory, and a belt reeved about the drive pulley and driven pulley; to provide such an arrangement including a waste gate mounted in the exhaust system and movable to variably control the proportion of exhaust which engages the turbine; to provide such an arrangement including a control computer which monitors the speed of the engine and controls the position of the waste gate in such a manner as to control the rotational speed of the turbine; to provide such an arrangement which enables more versatile control of engine accessories, such as controlling power steering assist in inverse proportion to vehicle speed, increased coolant circulation for hot weather idling, decreased coolant circulation for increased passenger compartment heating during cold weather, and the like; to provide such an arrangement including hydraulic actuation valves in the hydraulic lines between the hydraulic pump and the hydraulic motors which can be controlled to provide selective on/off switching of the accessories or variable control thereof; to provide such an arrangement wherein belt driven accessories may include a solenoid driven clutch which can be controlled to provide on/off switching of the belt driven accessory; to provide such an arrangement wherein the control computer has manually switched inputs and has outputs interfaced to the hydraulic actuation valves and/or the solenoid driven clutches for control through the computer; to provide such an arrangement wherein selected accessories have functions which are interfaced to inputs of the computer for automatic control of such accessories; to provide an embodiment of such an arrangement which can be retrofitted to some existing automotive engines; and to provide such an exhaust gas driven arrangement for engine accessories which is economical to manufacture, which is efficient and convenient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a block diagram illustrating the principal components of a third modified or indirect hydraulic embodiment of the present invention wherein a hydraulic motor drives a plurality of accessories engaged therewith by a pulleys and a belt.

FIG. 5 is a block diagram illustrating the principal components of a fourth modified or simplified embodiment of the present invention wherein a hydraulic pump is driven directly by an exhaust gas turbine.

FIG. 6 is a fragmentary diagrammatic sectional view of portions of a turbine for use in the simplified embodiment of the system according to the present invention.

FIG. 7 is a fragmentary diagrammatic sectional view of portions of a hydraulic pump for use in the simplified embodiment of the system according to the present invention.

DETAILED DESCRIPTION OF THE PREFERRED EMBODIMENTS

Figure 1:
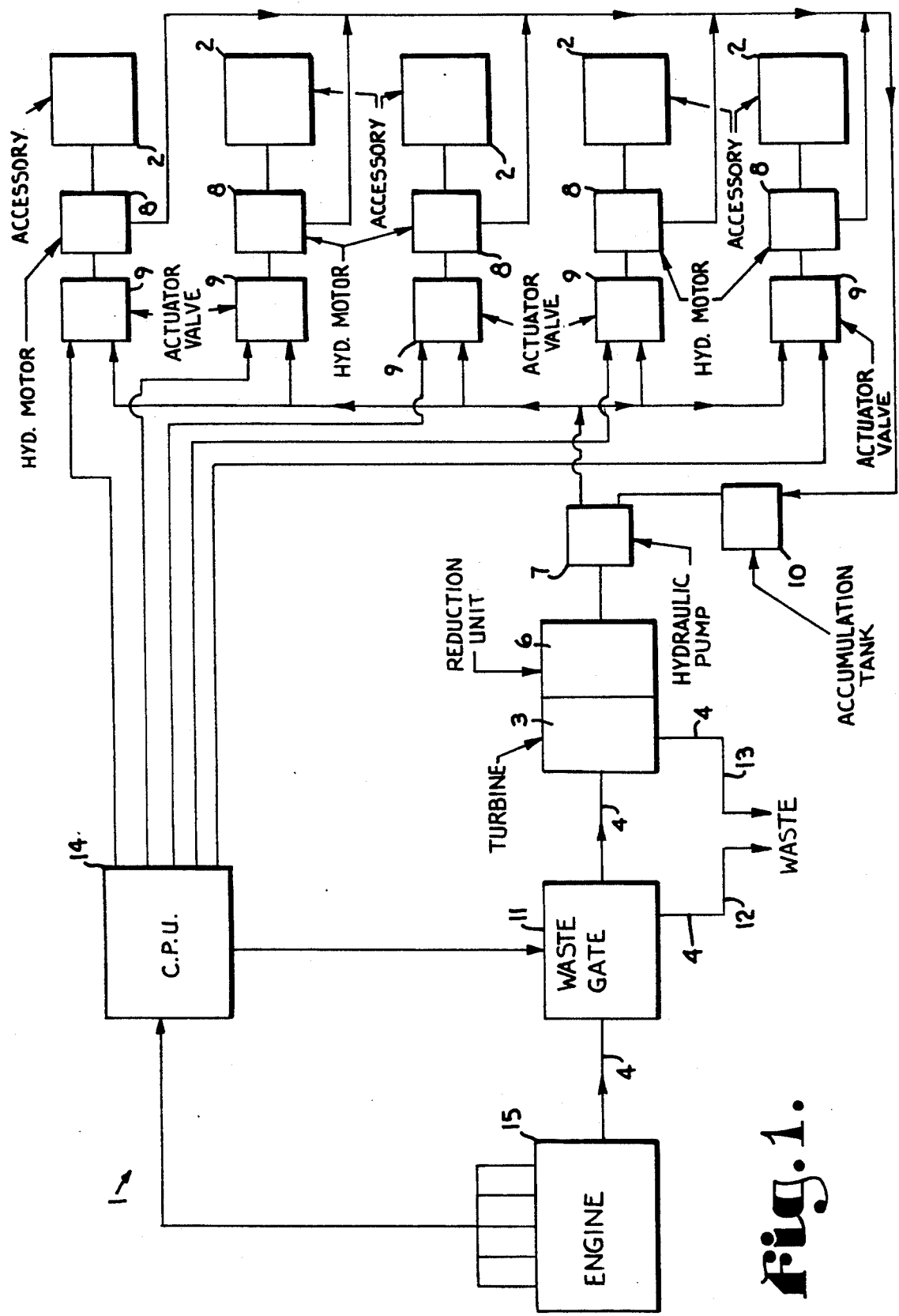
FIG. 1 is a block diagram illustrating the principal components of a hydraulic drive embodiment of the exhaust gas driven system for engine accessories which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates an exhaust gas drive system for engine accessories 2 which embodies the present invention. In general, the system 1 is a hydraulic drive embodiment of the invention and includes a turbine 3 rotated by exhaust gas travelling through an exhaust system 4 from an engine 5. The turbine 3 is engaged with a speed reduction transmission or reduction unit 6 which is connected to and drives a hydraulic pump 7. The pump 7 is fluidically connected to hydraulic motors 8 which are engaged respectively with the accessories 2 to drive same.

There is a limit to the amount of horsepower which can be derived from the exhaust gases of an engine of a given size without causing backpressure on the engine 5 and, thus, degrading the performance thereof. Depending on the size of the engine 5, the accessories 2 may include some combination of an alternator, a water pump, an air conditioner, power steering, power brakes, pollution control pumps, a secondary electrical generator, an air compressor, a winch, lift cylinders, or the like. A vehicle (not shown) incorporating the system 1 may have a combination of accessories 2 driven by the turbine 3 and other accessories (not shown) driven in a more conventional manner by driving engagement with the main shaft (not shown) of the engine 5.

The communication of hydraulic fluid to the hydraulic motors 8 is controlled by respective actuator valves 9 whereby the accessories 2 can be selectively turned on or off or controlled in a continuously variable manner. The valves 9 may be solenoid driven valves which are operated through respective relays (not shown). The illustrated actuation valves 9 may be in the form of on/off type valves or throttling valves where variable control of the particular accessory 2 is desired. An accumulation tank or hydraulic fluid reservoir 10 completes the hydraulic circuit from the motors 8 back to the pump 7.

The communication of exhaust gas to the turbine 3 is controlled by a waste gate 11. The waste gate 11 operates as a type of throttle which controls the proportions of the exhaust gas which are communicated to the turbine 3 and to a main exhaust pipe 12. The exhaust gas which motivates the turbine 3 is thereafter vented through an auxiliary exhaust pipe 13 back to the exhaust system 4. The turbine 3 is similar in some respects to the types of turbines used for automobile turbochargers. Exhaust turbines which rotate supercharging compressors rotate at extremely high speeds, on the order of 80,000 to 120,000 revolutions per minute (RPM). However, mechanical loading on the shaft of the illustrated turbine 3 from the speed reduction unit 6 and the hydraulic pump 7 retards the rotational speed of the turbine 3 considerably from such speeds. The rotational speed of the turbine 3 may still be too high to drive the pump 7, whereby the speed reduction unit 6 would be required with most conventional types of exhaust driven turbines 3. Modifications can be made to the pitch of turbine blades and clearances between the turbine 3 and its housing (not shown) to decrease the rotational speed imparted to the turbine 3 by a given flow volume of exhaust gas.

The operation of the waste gate 11 is preferably controlled automatically in order to maintain the rotational speed of the turbine 3 within a desired range. The illustrated system 1 incorporates a computer or CPU (central processing unit) 14 which monitors the rotational speed of the engine 5 and controls the position of the waste gate 11 to maintain a desired rotational speed of the turbine 3. Rapid changes in the rotational speed of the engine 5, the switching in or out of the accessories 2, and the rotational inertia of the turbine 3 will cause unavoidable variations in the rotational speed of the turbine 3. The position of the waste gate 11 may be controlled from the computer 14 by controlling engine vacuum applied to the waste gate 11, by means of an electric waste gate motor (not shown), or by other means which would occur to those skilled in the art.

The computer 14 also, preferably, controls the operation of the actuation valves 9, such as by way of suitable current drivers or amplifiers and relays (not shown) for on/off control. The computer 14 may receive control inputs from manual switches (not shown) operated by the driver. Additionally, the computer 14 may be programmed to deactivate selected accessories 2 when the detected speed of the engine 5 indicates that it is laboring, such as during acceleration of the vehicle powered by the engine 1. The computer 14 may control the ignition system of the engine 5 in addition to the waste gate 11 and actuation valves 9 or, preferably is a separate computer which may be interfaced to such an ignition control computer. The computer 14 may also monitor vehicle speed and control some of the accessories in relation to vehicle speed.

In addition to on/off control of the hydraulic motors 8 by the actuator valves 9, selected accessories 2 can be controlled by throttling valves for variation of the volume rate of hydraulic fluid communicated to the associated hydraulic motor 8. In some cases, such variable valves 9 may be controlled manually, or indirectly by means such as a stepper motor (not shown) under control of the computer 14. Such variable control would be useful, for example, to vary the degree of assist provided by a power steering accessory 2 in inverse proportion to the speed of the vehicle propelled by the engine 15, as detected by the computer 14, to increase the assist at low speeds at which steering effort increases and to decrease the assist at higher speeds where greater steering control is desired. In another example, the coolant circulation rate of a water pump accessory 2 could be increased during idling in hot weather to increase the transfer of heat from the engine 15 or decreased for greater heating in a passenger compartment in very cold weather.

The engine 5 may be a gasoline powered Otto cycle engine or a Diesel cycle engine. While the engine 5 has been described particularly as one which propels a land vehicle, the present invention does not so limit the engine 5. The engine 5 may alternatively be a type which propels an aircraft or a water craft. Additionally, the engine 5 may be one which operates in a stationary position, such as in a pumping or power generation application.

In contrast to engine accessories which are belt driven by the engine crankshaft which must be clustered about the engine at the opposite end from the transmission, the present invention enables the accessories 2 to be mounted at any convenient position on the vehicle, such as in the trunk, in wheel wells, beneath the floor pan on some vehicles, within the dash structure, or the like. Since the accessories 2 can be distributed throughout the vehicle, crowding within the engine compartment is decreased, resulting in more convenient access thereto for maintenance and repair. Additionally, the driving of the accessories by means other than the crankshaft can result in increased life of the crankshaft bearings, and of the engine in general, since radial loads on the crankshaft from tensioned belts on pulleys mounted on the end of the crankshaft can be eliminated. Finally, the elimination of crankshaft driven accessories eliminates their mechanical loads on the engine and substitutes some of the energy of the exhaust gas, which is otherwise wasted, to drive the accessories 2.

Figure 2:
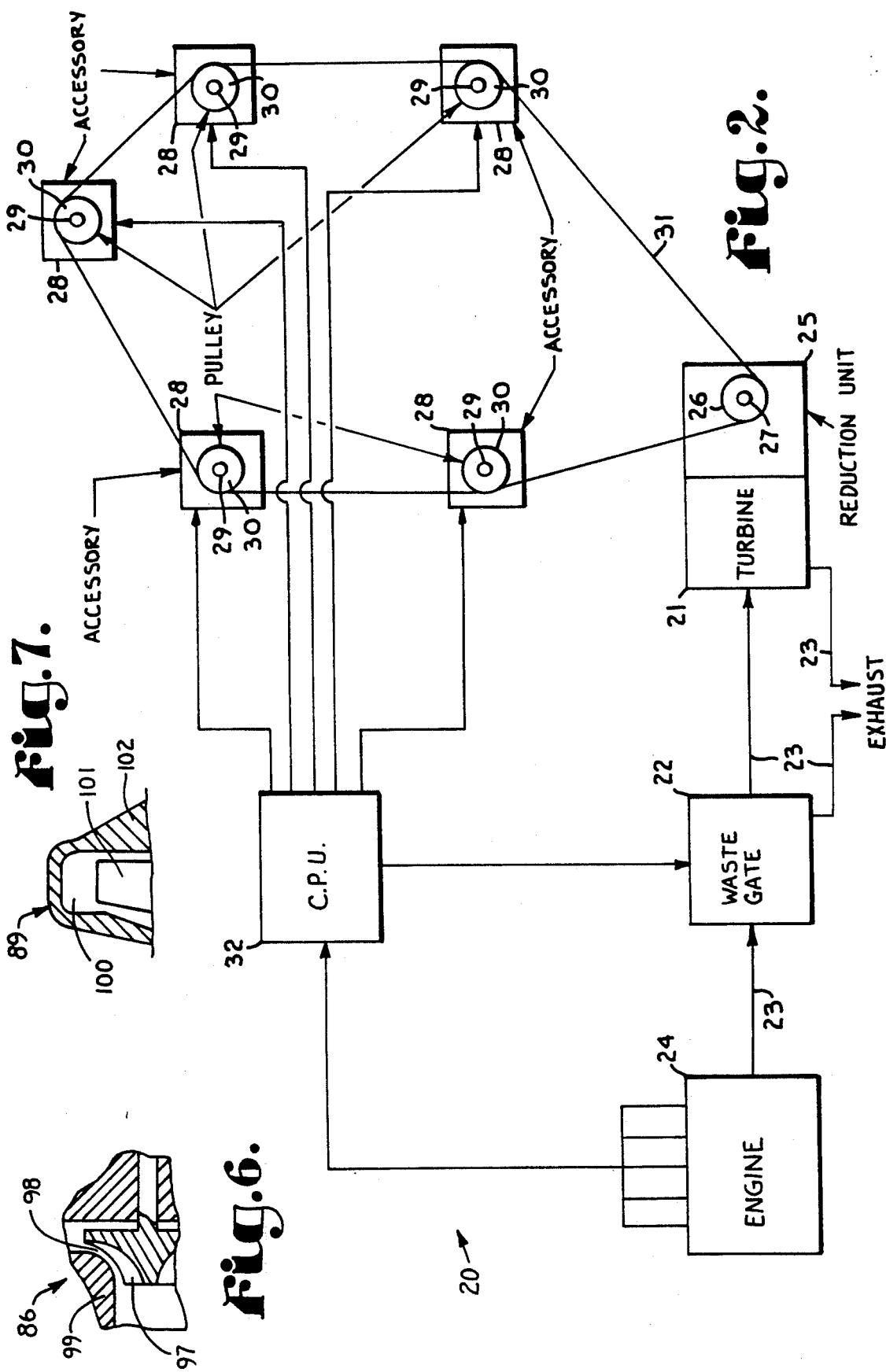
FIG. 2 is a block diagram illustrating the principal components of a first modified or belt drive embodiment of the exhaust gas driven system for engine accessories of the present invention wherein a drive pulley on a reduction transmission unit is engaged with driven pulleys of the accessories by a drive belt.

FIG. 2 illustrates a first modified or belt drive embodiment 20 of the present invention. The belt drive arrangement 20 has a turbine 21 receiving exhaust gas through a waste gate 22 from the exhaust system 23 of an engine 24. The turbine 21 is engaged with a speed reduction transmission or unit 25 which gears down the rotational drive from the turbine 21. The speed reduction unit 25 has a drive pulley 26 affixed to an output shaft 27 thereof. A plurality of accessories 28 have respective input drive shafts 29 with driven pulleys 30 mounted thereon. An endless drive belt 31 is reeved about the drive pulley 26 and the driven pulleys 30 to transfer rotational drive from the speed reduction unit 25 to the accessories 28.

The rotational speed of the engine 24 is monitored by a control computer or CPU (32) to control the position of the waste gate 22 to thereby regulate the rotational speed of the turbine 21. Some or all of the accessories 28 may incorporate solenoid driven clutches (not shown) which are additionally controlled by the computer 32 to allow on/off control of such accessories 28 by effectively disengaging such accessories 28 from the rotational drive provided by the belt 31. In other respects, the arrangement 20 operates in a substantially manner to the preferred arrangement 1.

Figure 3:
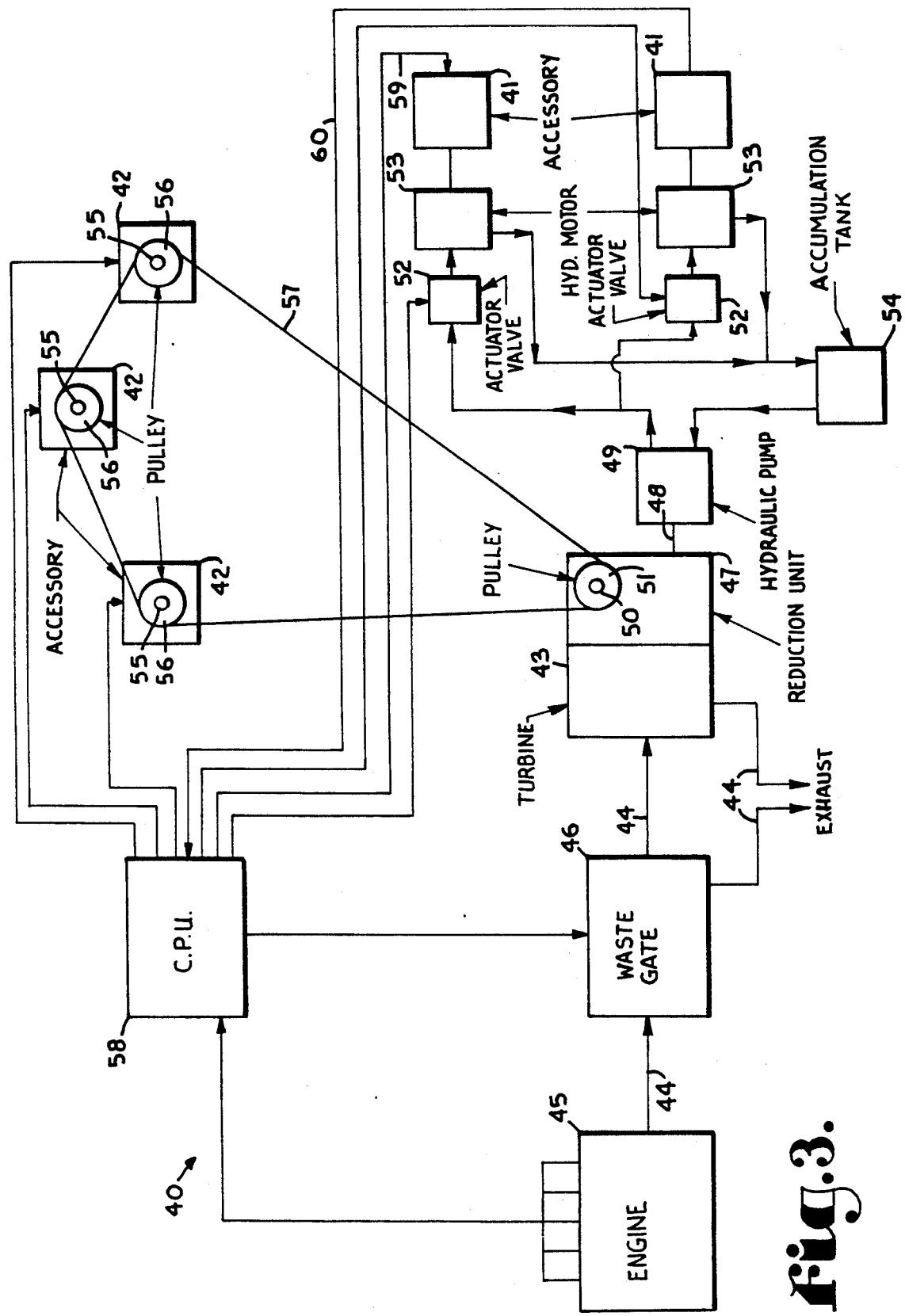
FIG. 3 is a block diagram illustrating the principal components of a second modified or combination drive embodiment of the system of the present invention which combines hydraulically driven accessories with belt driven accessories.

FIG. 3 illustrates a second modified embodiment 40 of the exhaust gas driven system for engine accessories of the present invention which combines aspects of the preferred arrangement 1 and the belt driven arrangement 20. The combination arrangement 40 includes hydraulically driven accessories 41 and belt driven accessories 42. The arrangement 40 includes a turbine 43 positioned within the exhaust system 44 of an engine 45 and receiving exhaust gas from the engine 45 through a waste gate 46. The turbine 43 is engaged with a speed reduction transmission unit 47 which has a first output shaft 48 engaged with a hydraulic pump 49 and a second output shaft 50 having a drive pulley 51 mounted thereon.

The hydraulic pump 49 is fluidically connected through actuator valves 52 to respective hydraulic motors 53 which are engaged with the hydraulically driven accessories 41. The actuator valves 52 enable selective activation and deactivation or variable control of the hydraulically driven accessories 41. An accumulation tank or hydraulic reservoir 54 completes the hydraulic circuit from the motors 53 back to the hydraulic pump 49. Each of the belt driven accessories 52 has an input drive shaft 55 with a driven pulley 56 mounted thereon. An endless drive belt 57 is reeved about the drive pulley 51 and the driven pulleys 56 to transfer driving rotation from the speed reduction unit 47 to the belt driven accessories 42. The belt driven accessories 42 may incorporate solenoid driven clutches (not shown) to allow their selective engagement with and disengagement from the driven pulleys 56.

The combination arrangement 40 is provided with a control computer or CPU 58 which monitors the rotational speed of the engine 45 and controls the position of the waste gate 46 to control the proportion of exhaust gas which is applied to the turbine 43. The computer 58 preferably controls the activation and deactivation of the hydraulically driven accessories 41 and the belt driven accessories 42. The computer 58 may also be connected directly to the accessories 41 and 42 to control various operating functions thereof, as shown by an output control line 59, and may receive signals from the accessories 41 and 42, as shown in FIG. 3 by an input control line 60, such as a thermostatic control signal from an air conditioning unit. In other respects, the combination arrangement 40 operates in a manner substantially similar to the preferred arrangement 1 and the belt driven arrangement 20.

FIG. 4 illustrates a third modified or indirect hydraulic drive embodiment 65 of the present invention. A turbine 66 receives exhaust gas through a waste gate 67 from an engine 68. A hydraulic pump 69 is connected to the turbine 66 through a speed reduction transmission unit 70 and drives a hydraulic motor 71 through an actuation valve 72. An accumulation tank or hydraulic reservoir 73 supplies hydraulic fluid to the pump 69 which is returned thereto from the hydraulic motor 71. The hydraulic motor 71 has an output or drive shaft 75 with a drive pulley 76 mounted thereon. Each of a plurality of belt driven accessories 77 has an input shaft 78 with a driven pulley 79 mounted thereon. Drive is transferred from the hydraulic motor 71 to the accessories 77 by a drive belt 80 which is reeved about the drive pulley 76 and the driven pulleys 79. The accessories 77 may be controlled by a computer 81, as by means of a solenoid driven clutch 82. The computer 81 also controls the waste gate 67 and the actuation valve 72.

FIG. 5 illustrates a fourth modified or simplified embodiment 85 of the exhaust driven system for engine accessories of the present invention. In the arrangement 85, a turbine 86 is positioned in the exhaust system 87 of an engine 88 and receives pressurized exhaust gas therefrom. The turbine 86 is connected directly to a hydraulic pump 89 which drives a hydraulic motor 90. The motor 90 has an output shaft 91 with a drive pulley 92 mounted thereon. Each of a plurality of belt driven accessories 93 has an input shaft 94 with a driven pulley 95 mounted thereon. Rotation is transferred from the hydraulic motor 90 to the accessories 93 through a drive belt 96 reeved about the drive pulley 92 and the driven pulleys 95.

In general, the simplified arrangement 85 eliminates the speed reduction transmission by geometric modifications to the turbine 86 and the hydraulic pump 89. Turbine vanes 97 (FIG. 6) of the turbine 86 have a modified pitch, and there is an increased clearance 98 between portions of the turbine 86 and a turbine housing 99 thereof whereby a given flow volume of exhaust gas causes the turbine 86 to rotate at a slower angular rate than would occur with a more conventional turbine vane pitch and tighter clearances 98. Additionally, the clearance 100 (FIG. 7) between a rotor 101 and a stator 102 of the hydraulic pump 89 is increased so that for a given rotational speed of the rotor a lower volume rate of hydraulic fluid is pumped to the hydraulic motor 90, thereby compensating for the rotational speed provided by the turbine which is higher than normally input to a hydraulic pump.

The lack of a speed reduction transmission greatly reduces the cost of the arrangement 85 compared to the other embodiments 1, 20, 40, and 65, described hereinabove. The arrangement 85 additionally eliminates the waste gate, the accumulation tank, the actuation valves, and the computer which are components of the above embodiments of the present invention. The simplification of the arrangement 85 enables it to be retrofitted to some existing vehicles with relative convenience.

It is to be understood that while certain forms of the present invention have been illustrated and described herein, it is not to be limited to the specific forms or arrangement of parts described and shown.

What is claimed and desired to be secured by Letters Patent is as follows:

1. An exhaust drive system for driving engine accessories from engine exhaust and comprising:
   (a) an engine including exhaust means;
   (b) a plurality of engine accessories;
   (c) a gas turbine;
   (d) fluidic communication means for communicating the engine exhaust means with the turbine to rotate same;
   (e) accessory drive means drivingly interconnecting said turbine with each of said accessories; and
   (f) a control system for independently and selectively actuating said accessories.

2. A system as set forth in claim 1 wherein said accessory drive means includes:
   (a) a drive pulley drivingly connected to said turbine;
   (b) a driven pulley drivingly connected to at least one of said accessories; and
   (c) a drive belt drivingly interconnecting said drive pulley and said driven pulley.

3. A system as set forth in claim 2 and including:
   (a) reduction transmission means having an input drivingly connected to said turbine and an output drivingly connected to said accessory.

4. A system as set forth in claim 3 and including:
   (a) a plurality of accessories each having a driven pulley; and
   (b) said drive belt being drivingly connected to each driven pulley.

5. A system as set forth in claim 1 wherein said fluidic communication means includes:
   (a) a waste gate adapted controlling communication of said engine exhaust with said turbine.

6. A system as set forth in claim 1 wherein said accessory drive means includes:
   (a) a hydraulic pump drivingly connected to said turbine; and
   (b) a hydraulic motor hydraulically connected to said hydraulic pump and drivingly connected to at least one of said accessories.

7. A system as set forth in claim 6 and including:
   (a) each of said accessories having a respective hydraulic motor hydraulically connected to said hydraulic pump.

8. A system as set forth in claim 1 wherein said accessory drive means includes:
   (a) a reduction transmission unit having an input drivingly connected to said turbine and first and second transmission outputs;
   (b) a drive pulley drivingly connected to said transmission first output;
   (c) a hydraulic pump drivingly connected to said transmission second output;
   (d) a first plurality of said accessories being belt driven and each having a respective driven pulley;
   (e) a drive belt drivingly connected to said drive pulley and said driven pulleys; and
   (f) a second plurality of said accessories being hydraulically driven and each having a hydraulic motor hydraulically connected to said hydraulic pump.

9. A system as set forth in claim 1 wherein said accessory drive means includes:
   (a) a hydraulic pump drivingly connected to said turbine;

(b) a hydraulic motor hydraulically connected to said hydraulic pump and having an output shaft with a drive pulley mounted thereon;
(d) each of said accessories having an input shaft with a driven pulley mounted thereon; and
(e) a drive belt drivingly engaged between said drive pulley and each driven pulley.

10. A system as set forth in claim 15 and including:
(a) reduction transmission means drivingly connecting said turbine to said hydraulic pump.

11. A system as set forth in claim 1 wherein:
(a) said turbine includes turbine vanes and is positioned in a turbine housing to rotate about a turbine axis; and
(b) said turbine vanes are oriented relative to said turbine axis to result in a selected rotation speed of said turbine for a selected exhaust gas flow volume and velocity therethrough.

12. A system as set forth in claim 1 wherein:
(a) said turbine is mounted within and in spaced relation to a turbine housing.

13. A system as set forth in claim 1 wherein:
(a) said turbine includes turbine vanes and is positioned in a turbine housing to rotate about a turbine axis, portions of said turbine being in spaced relation to portions of said housing.

14. A system as set forth in claim 1 wherein said accessory drive means includes:
(a) a hydraulic pump drivingly connected to said turbine, said hydraulic pump including a rotor and a stator, portions of said rotor and stator being positioned in spaced relation; and
(b) a hydraulic motor hydraulically connected to said hydraulic pump and drivingly connected to a least one of said accessories.

15. A system as set forth in claim 14 wherein:
(a) said turbine includes turbine vanes and is positioned in a turbine housing to rotate about a turbine axis, portions of said turbine being in spaced relation to portions of said housing.

16. An exhaust drive system for driving engine accessories from engine exhaust and comprising:
(a) an engine with exhaust means;
(b) a plurality of engine accessories;
(c) a gas turbine;
(d) fluidic communication means for communicating the engine exhaust means with the turbine to rotate same;
(e) accessory drive means drivingly interconnecting said turbine with each of said accessories;
(f) a control system for independently and selectively operating said accessories;
(g) a drive pulley drivingly connected to said turbine;
(h) a driven pulley drivingly connected to at least one of said accessories;
(i) a drive belt drivingly interconnecting said drive pulley and said driven pulley;
(j) reduction transmission means having an input drivingly connected to said turbine and an output drivingly connected to said accessory;
(k) a plurality of accessories each having a driven pulley;
(l) said drive belt being drivingly connected to each driven pulley; and
(m) a control system for independently and selectively actuating said accessories.

17. A system as set forth in claim 16 wherein:
(a) said control system includes a microprocessor with inputs connected to said engine and outputs connected to said accessories.

18. An exhaust drive system for driving engine accessories from engine exhaust and comprising:
(a) an engine with exhaust means;
(b) a plurality of engine accessories;
(c) a gas turbine;
(d) fluidic communication means for communicating the engine exhaust means with the turbine to rotate same;
(e) accessories drive means drivingly interconnecting said turbine with each of said accessories;
(f) a hydraulic pump drivingly connected to said turbine;
(g) a hydraulic motor hydraulically connected to said hydraulic pump and drivingly connected to at least one of said accessories;
(h) each of said accessories having a respective hydraulic motor hydraulically connected to said hydraulic pump; and
(i) a control system connected to said engine and to at least one of said hydraulic motors for selectively and independently controlling same.

19. A system as set forth in claim 18 wherein said accessory drive means includes:
(a) a plurality of actuator valves each connected to a said control system and hydraulically connecting said hydraulic pump with a respective hydraulic motor.

20. An exhaust drive system for driving engine accessories from engine exhaust and comprising:
(a) an engine with exhaust means;
(b) a plurality of engine accessories;
(c) a gas turbine;
(d) fluidic communication means for communicating the engine exhaust means with the turbine to rotate same;
(e) accessories drive means drivingly interconnecting said turbine with each of said accessories;
(f) a reduction transmission unit having an input drivingly connected to said turbine and first and second transmission outputs;
(g) a drive pulley drivingly connected to said transmission first output;
(h) a hydraulic pump drivingly connected to said transmission second output;
(i) a first plurality of said accessories being belt driven and each having a respective driven pulley;
(j) a drive belt drivingly connected to said drive pulley and said driven pulleys;
(k) a second plurality of said accessories being hydraulically driven and each having a hydraulic motor hydraulically connected to said hydraulic pump; and
(l) control means comprising a microprocessor with an input connected to said engine and multiple control outputs each connected to a respective accessory.

21. A system as set forth in claim 20 and including:
(a) a plurality of actuator valves hydraulically connecting said hydraulic pump with a respective hydraulic motor for selectively actuating said respective hydraulic motor.

* * * * *